UNITED STATES PATENT OFFICE.

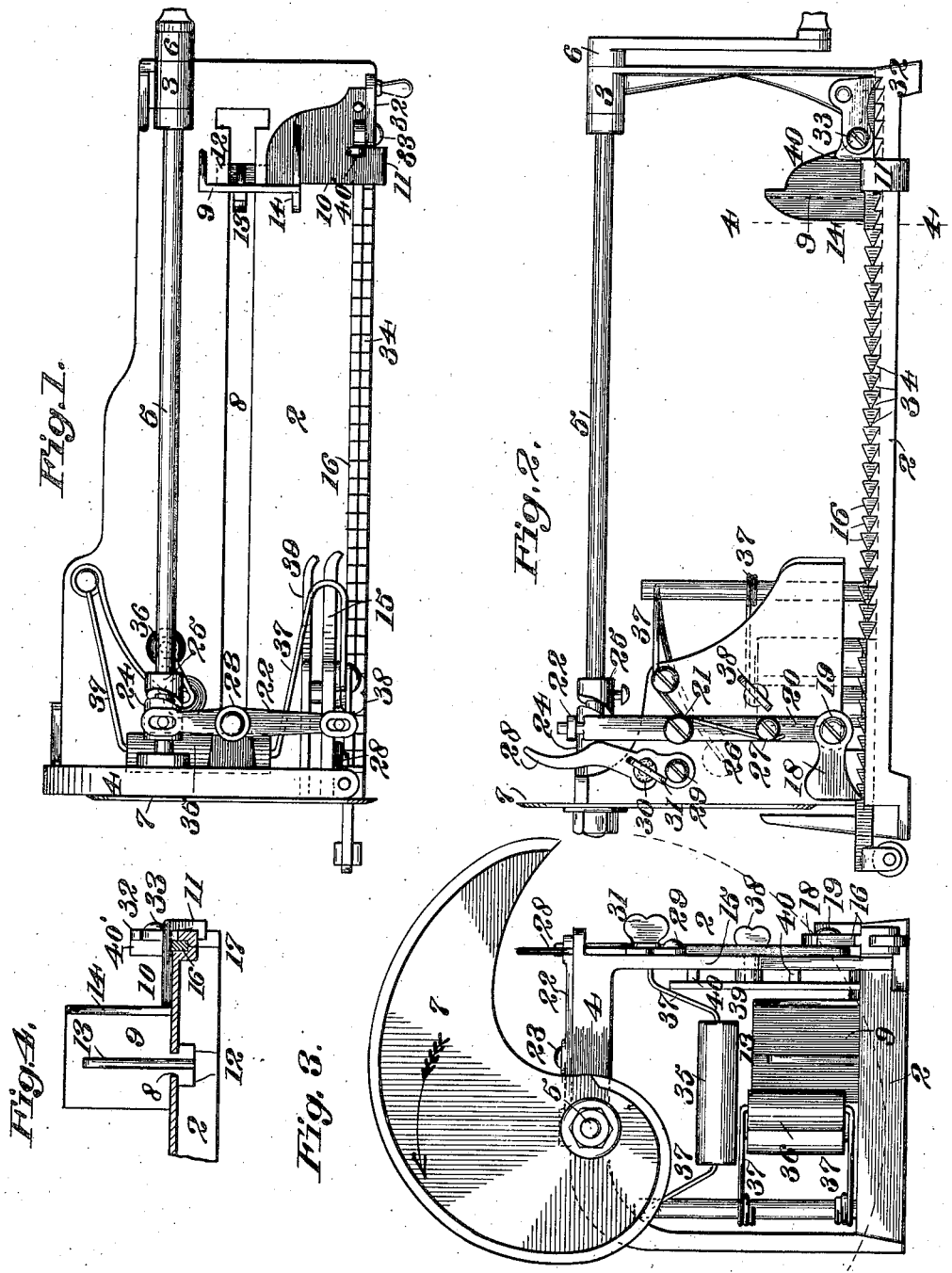

JULES HABRIE, OF SAN FRANCISCO, CALIFORNIA.

BREAD-CUTTER.

1,110,773.

Specification of Letters Patent. Patented Sept. 15, 1914.

Application filed November 4, 1912. Serial No. 729,207.

*To all whom it may concern:*

Be it known that I, JULES HABRIE, a citizen of the United States, residing at the city and county of San Francisco and State of California, have invented new and useful Improvements in Bread - Cutters, of which the following is a specification.

This invention relates to a slicing apparatus, and particularly relates to a device whereby bread and other material may be cut into slices of different thicknesses.

It is an object of the present invention to provide a bread slicing apparatus including a rotary cutter, a table or frame upon which the bread or other material to be cut may be placed, and a feeding mechanism whereby the bread is advanced in intermittent steps.

It is a further object of the invention to provide an improved bread feeding device consisting of a pusher, with means for giving the pusher a variable length of feed to change the thickness of slices, and to provide a back lock for the pusher to prevent the latter from being pushed backwardly by the pressure of the bread.

The invention consists of a table in combination with a cutter, and a feeding mechanism with means for automatically yielding to receive loaves of bread of different proportions and for holding the same steady when presented to the cutter.

It also comprises details of construction which will be more fully explained by reference to the accompanying drawings, in which—

Figure 1 is a plan view of the apparatus. Fig. 2 is a side elevation of the same. Fig. 3 is a view of the front end of the device. Fig. 4 is a detail cross section on line 4—4, Fig. 2.

In its present form my invention comprises a table or bed 2, of suitable proportions and shape, having at its ends suitable bearings 3—4 for a shaft 5. Upon the shaft 5 may be mounted a handle or crank 6 by which power is applied to drive the shaft and rotate a suitable form of cutter 7, which is attached to the opposite end of the shaft and when revolving sweeps across the end of the bed so as to sever or partly sever bread or other material to be cut into slices.

The table or bed 2 is provided with a longitudinally extending channel or slot 8, through which projects a portion of a pusher 9 which has a transversely extending arm 10. The arm 10 has an overlapping hook portion 11 underlapping the adjacent edge of the bed 2 and forming a steadying slide for the pusher 9, which is held from vertical movement over the central portion of the bed 2 by the lateral lugs 12 which project under the sides of the bed 2 adjacent to the channel 8.

The pusher or bread feeding device 9 may be provided with a tooth or prong 13, spaced slightly in front of the body of the pusher 9, over which prong may be downwardly pressed a loaf of bread or other material to be sliced; the corner of the bread being adjustable against a stop shoulder or flange 14 formed on the pusher body 9.

Sometimes it is necessary to entirely sever the slices from the loaf and at other times it is desired to leave the slices slightly connected to the loaf so that the cut bread will remain fresh for a longer period, the slight connection joining which slices tending to hold the same together and exclude air. In the event that the bread is to be entirely severed or sliced, then the loaf is impinged on the point or prong 13 with one corner of the bread adjusted against the limit stop or shoulder 14. If the bread is to be cut with the slices still remaining connected, the loaf is deposited against a side wall or wing 15 of the device, so that when the cutter 7 sweeps around it fails to reach entirely across the bread, thus leaving the latter connected at the lower corner adjacent to the wall 15.

One of the important parts of the present invention is the structure of the bread pusher or feeder and its actuating mechanism. I have shown connected to the transverse arm 10 of the pusher a toothed, longitudinally extending bar 16 guided in a channel or way 17 and extending forwardly along the bed 2 so as to be engaged by a pawl 18. The pawl 18 is pivoted at 19 on a lever 20 journaled on a stud or screw 21, projecting from the side wall 15. The upper end of the lever 20 coöperates with the adjacent end of a horizontally disposed lever 22, which is pivoted upon a screw or pin 23, fastened in the bearing 4; the lever 22 being operated by a collar 24 slidable on the crank shaft 5. One end of the collar 24 is inclined, and, when engaged by a coöperative cam 25 fixed on the shaft 5, will be reciprocated when the shaft is revolved.

Suitable means may be provided for normally thrusting the slidable cam 24 toward the fixed cam 25. In the present instance I have shown a spring 26 acting against a pin or screw 27 on the lever 20; the force of the spring tending to throw the lever 20 rearward, that is, toward the pusher 9, which movement throws the end of the lever 22 toward the cutter 7. The cam 24 is shifted toward its actuating cam 25, so that when the shaft 5 is revolved, the coöperative cam 25 and collar 24 will rock the lever 22 to throw the lever 20 and carry the pawl 18 toward the cutter 7, which movement of the pawl will cause the feed bar or rack 17 to draw the bread pushing device 9 forward and feed the bread under the cutter 7.

In order to vary the amount of feed of the feed device 9 to obtain slices of different thicknesses, I have shown a stop device 28 in the form of a lever pivoted on a pin or screw 29 in the side wall 15; the stop 28 being slotted at 30 so as to permit adjustment relative a set screw 31. When it is desired to obtain a slice of bread of a certain thickness, the operator unloosens the set screw 31 and sets the stop lever 28 in such a position that the contiguous portion of the lever 20 will abut it and thus hold the lever 22, with its coöperative collar 24, at a given distance from the cam 25. The effect of the adjustment of the lever 28 is to prevent the slide collar 24 from approaching the cam 25 under pressure of the spring 26.

If a thick slice of bread is desired, then the lever 28 is thrown away from the upper end of the lever 20, thus permitting the spring 26 to throw the collar 24 well toward its actuating cam 25, and when this latter makes a full revolution, its inclined face will reciprocate the collar 24 to impart to the feed pawl 18 its maximum forward motion. When a thin slice of bread is to be cut, the stop lever 28 is adjusted over toward the upper end of the lever 20 so as to prevent this from taking its full swing, the effect being to hold the collar 24 a certain distance away from the cam 25, so that this will not impart to the collar 24 a full reciprocation, because a part of its rotation will be idle with respect to the collar 24.

I have found it to be desirable in actual practice to prevent accidental back motion of the pusher 9 with its connected feed rod 17. I provide against this back feed by an automatic locking device consisting of a pawl 32, pivoted on a pin or screw 33 of the pusher device arm 10, and during the forward feed of the pusher the pawl 32 automatically engages with teeth 34 formed in, or appropriately attached to, the bed frame or table 2. Thus the pawl 32 effectually and automatically operates to lock the feeding device 9 to prevent its back movement against the pressure of accumulated slices of bread in front of the cutter.

For the purpose of steadying and holding bread or other material while being cut, I have provided a series of pressure rollers, some of which are horizontal, as at 35, and others vertical, as at 36, each of the rollers 35 and 36 being provided with resilient arms or spring 37, the function of which is to throw the rollers against the bread to hold this down upon the table 2 and against the side wall 15. The spring arms 37 are sufficiently yieldable to permit the insertion of a large or small loaf of bread and effectually hold this while the pusher device is feeding the loaf forward.

When material to be cut is deposited in the apparatus, with one side against the side wing or supporting wall 15, then the cutter in sweeping around will not entirely sever the slices from the material being cut, leaving a lower corner of each slice connected to the loaf. When it is desired to entirely sever the slices from the loaf, I then attach to the side wall 15, by a screw or other suitable clamp 38, a false wall or guide 39 which may have lugs or fillers 40 which serve the purpose of spacing the operative face of the false wall 39 sufficiently near the center of the table 2 to insure that during its sweep the cutter will entirely sever the slice.

As before stated, when the slices are to be entirely severed from the loaf, I impinge the loaf on the pin or prong 13 of the pusher device 9 and adjust the side guide 39 in position on the wall 15. By turning the crank shaft 5, the feeding mechanism will advance the pusher and the cutter will sever the slices successively until the last cut is made, when a single slice will remain upon the prong 13 and the several slices accumulate in front of the cutter.

When the slices are not to be entirely severed but are to be left connected to the loaf, the loaf is lodged against the side wall 15, the false guide wall 39 being removed, and then the feeding device 9 is pushed forwardly until it abuts against the end of the loaf, subsequent to which the loaf will be advanced in intermittent steps during the rotation of the shaft 5 by the actuation of the feeding mechanism.

The bread feeding or pusher device 9—10 is provided with a part 40′ projecting upwardly, which is adapted to engage with a part of the feeding mechanism, for instance, by contacting with the pawl 18 when the feeder 10 has been advanced far enough along; the function of the abutment or projection 40′ being, after coming into engagement with the pawl of the feeding mechanism, to gradually follow the pawl in its oscillations, due to the revolution of the actuating cam 25, until the bread pushing prong 13 approaches closely to the path of movement of the cutter 7. Then the lever 10 and its associated operating lever 22 will hold the reciprocating collar 24 out of the path of movement of the cam 25, because of the automatic lock 32 holding the bread feeding device 10 forward, so that the lug 40' engaging the feeding machanism at pawl 18 will prevent the bread feeder from back movement. The effect of this engagement by the abutment 40' with the feeding mechanism is to throw the collar 24 out of operative relation with the cam 25, the back pressure of the spring 26 on the lever 20 being counteracted by the rock pawl 22.

Having thus described my invention, what I claim and desire to secure by Letters Patent is—

1. In a bread cutting apparatus, a bed having a longitudinal slot and a channel parallel to the slot, a pusher having a part which projects down through the slot and having lugs which engage the under face of the bed on opposite sides of the slot, a toothed bar in the channel, an arm extending transversely from the pusher and overlying the bar and connected thereto and having its free or outer end extended downwardly and inwardly to engage the outer side edge and under face respectively of the bed, cutting means, and means operated by the movement of the cutting means to advance the bar by engagement with the teeth thereof.

2. In a bread cutting apparatus, a bed, a side wall extending upwardly from the bed to engage the side of a loaf of bread, a detachable upwardly extending wall arranged in spaced relation to the inner face of the first named wall to engage the side of a loaf of bread, means to rigidly connect the second named wall to the first named wall, a rotary cutter, and means to mount the cutter whereby the latter will completely sever a slice from the loaf when the latter is engaged with the second named wall and will but partially sever a slice from the loaf when the latter is engaged with the first named side wall.

In testimony whereof I have hereunto set my hand in the presence of two subscribing witnesses.

JULES HABRIE.

Witnesses:
 JOHN H. HERRING,
 W. W. HEALEY.